May 29, 1945. H. G. HEIL 2,377,149
SPARE TIRE CARRIER AND HOIST
Filed Sept. 30, 1943 2 Sheets-Sheet 1

INVENTOR
HAROLD G. HEIL.
BY
ATTORNEY

May 29, 1945.   H. G. HEIL   2,377,149
SPARE TIRE CARRIER AND HOIST
Filed Sept. 30, 1943   2 Sheets-Sheet 2

INVENTOR.
HAROLD G. HEIL
BY
ATTORNEY

Patented May 29, 1945

2,377,149

UNITED STATES PATENT OFFICE 2,377,149

SPARE TIRE CARRIER AND HOIST

Harold G. Heil, Middletown, N. Y.

Application September 30, 1943, Serial No. 504,417

4 Claims. (Cl. 224—29)

This invention relates to the carrying and handling of spare truck tires and particularly to a spare truck tire carrier which has associated therewith mechanical means for facilitating the lifting of the tire into carrying position and the removal of the tire from the carrier and its deposition upon the surface upon which the truck is resting, or upon any suitable tire-applying device, when it is desired to change the tire.

Various devices have been provided heretofore to facilitate the changing of heavy truck tires on trucks but the majority of these have had to do primarily with the handling of the spare truck tire or wheel in the changing operation but little has been done in the way of facilitating either the transfer of the spare truck tire or wheel from its carrier on the truck to the surface upon which the truck rests or the lifting of the tire or wheel into the tire carrier. The present invention has, therefore, for its general object the provision of a combined spare tire or spare wheel carrier and tire or wheel handling derrick for trucks which is of comparatively simple and inexpensive construction and which can readily be operated both to swing the spare tire or wheel from the carrier to a point where it can conveniently be handled and also to swing the tire or wheel from the ground or other support back into its carried position. It is apparent that the present invention is applicable both to spare tires carried on rims and to spare tires carried on spare wheels. For simplicity the term "spare tire" will be used throughout the specification and claims to cover both modes of mounting spare tires, that is, both the mere rim mounting and the spare wheel mounting.

An important feature of the invention is the provision, as a part of the spare tire carrier, of a derrick boom and mechanical operating means for said boom which are so constructed and arranged that when the means for securing the spare tire in its carrier have been released the derrick boom may immediately be operated to lift the tire from the carrier and transport it either to the surface upon which the truck rests or to other tire transporting means such as are sometimes used in garages.

Another important feature of the invention is the simple means for securing the tire in its carrier, such means serving both to secure the tire against movement and at the same time to secure the derrick boom against movement during the travel of the truck over the road.

Figure 1:
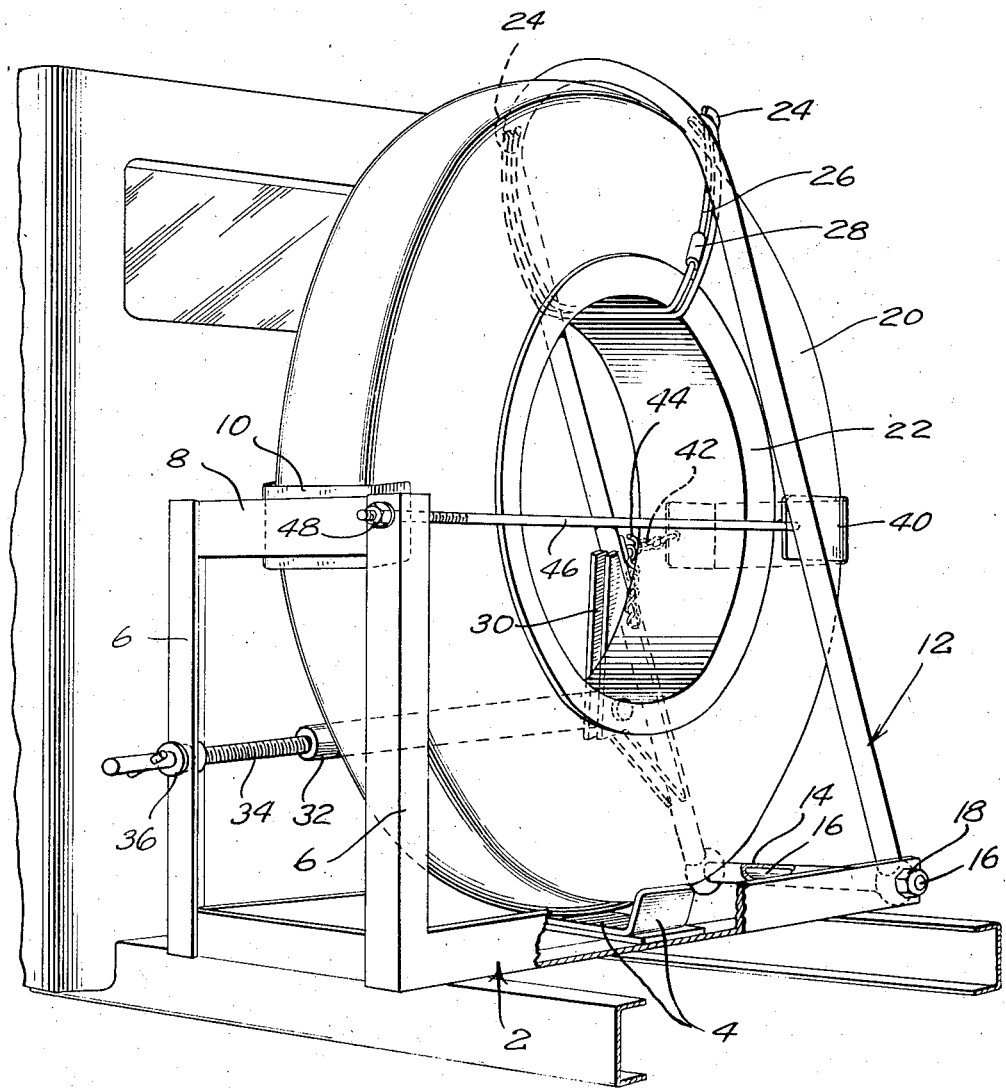
Figure 2:
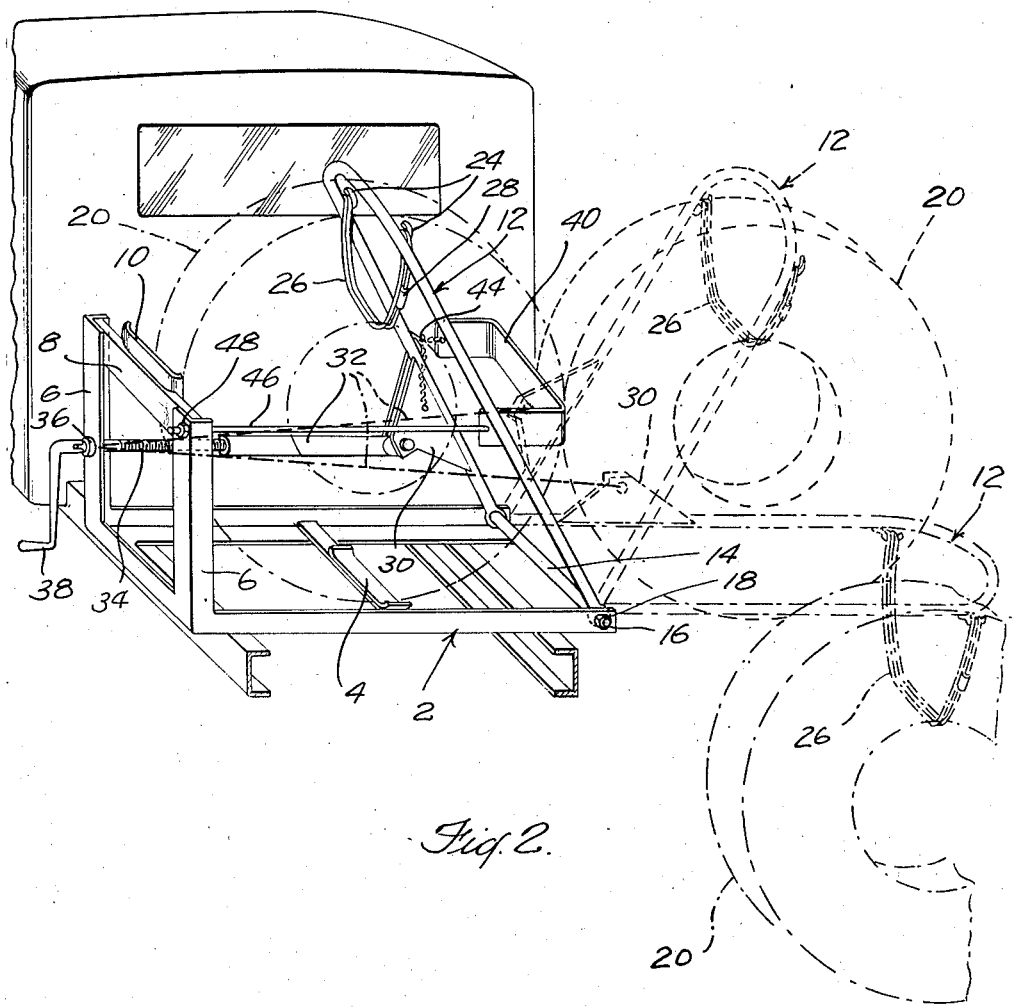

Other objects and important features of the invention will appear when the following detailed description and claims are considered in connection with the accompanying drawings, in which Figure 1 is a perspective view of a combined tire carrier and tire handling derrick embodying the present invention, this apparatus being shown in this view as mounted on the truck chassis immediately behind the cab. In this figure the tire and derrick boom are shown in the positions which they assume when the tire is secured in the carrier;

Figure 2 is a smaller perspective view showing some of the parts in greater detail and also showing in dotted lines successive relations of the parts in the movement of the derrick boom to transport the spare tire from the carrier to the surface upon which the truck rests or to other handling means and vice versa.

In the illustrative embodiment of the invention the frame in which the spare tire rests when it is being carried is shown as made of angle iron and comprises the bottom or rest portion 2 having thereon a tread centering device comprising a cross piece 4 having upturned tire side engaging flanges and a vertical abutment portion 6 having on its crossbar 8 a second tread centering device 10, the centering devices 4 and 10 serving to prevent lateral shift of the spare tire when the vehicle is traveling over the road.

At the end of the bottom part 2 of the frame of the tire carrier opposite the upright part 6 is a derrick boom 12 which is hinged to or fulcrumed upon the part 2 of the frame in any suitable manner. As herein shown, the derrick boom 12 is of substantially inverted U shape and preferably has welded to the ends of the legs of the U a cross tube 14 through which passes the bolt 16 threaded on its end to receive a nut 18, the bolt 16 constituting the fulcrum or hinge about which the derrick boom 12 turns. The length of the boom 12 to the U end thereof is sufficient so that when the boom is in the position shown in Figure 1 it freely straddles the spare tire 20.

Any suitable means may be provided for suspending the spare tire 20, together with the rim 22 upon which it is mounted, from the derrick boom 12 to permit the boom to swing or transport it from the carrier substantially to the place of use. In the illustrative embodiment of the invention each of the legs of the U-shaped boom 12 is provided near the U end of the boom with a hook 24 over which the looped or ringed end of any suitable suspending means may be hooked. As herein shown, the suspending means comprises a wire cable 26 having its ends connected together at 28 to form a loop and having the ends of the loop hooked over the hooks 24 after the two sides of the flattened loop have been passed through the rim 22.

Any suitable mechanical means may be provided for swinging the derrick boom 12 between its tire-carrying position and its tire delivering position, and vice versa, and such means may be either power operated or manually operated. In the illustrative embodiment of the invention manually operated means are shown for effecting the swinging movements of the derrick boom. As herein shown, a forked bracket 30 is shown as welded to the leg of the derrick boom which is adjacent to the cab in Figures 1 and 2. Fulcrumed to the bracket 30 between the two sides thereof is a screw-threaded socket 32 of sufficient length to provide for substantial telescoping movement of said socket and of the boom operating screw 34 which has its unthreaded part mounted in a flanged bearing 36 loosely mounted in one of the upright angle members of the abutment part 6 of the carrier in such manner that the screw can swing somewhat in a vertical plane during the swinging movements of the derrick boom 12. A crank arm 38, connected to the unthreaded end of the screw 34, permits turning thereof by the operator to effect the swinging movements of the derrick boom 12 and the transport of the spare tire 22 from its carried position substantially to the point of use and vice versa.

It will be seen that with this screw and crank arrangement there is such multiplication of power that even the heaviest spare tire or wheel can readily be lifted into the carrier or taken out of it with little effort and without the necessity for any direct lifting by the truck operator.

As shown in Figure 1 and in somewhat more detail in Figure 2, the spare tire 20 is preferably so secured in the carrier that it will not move about when the truck is in motion. In the illustrative embodiment of the invention the means for holding the spare tire 20 against shifting movement in the carrier comprise a tread-engaging strap 40 connected at one end to a chain 42, a link of which may be hooked over a hook 44 on the derrick leg adjacent to the cab. At its other end the strap 40 is connected to a rod 46 threaded at its end to receive a nut 48, the threaded end of the rod 46 passing through a hole in one of the upright angle members of the abutment part 6 of the carrier. With the construction thus described, it will be seen that, when the tire has been brought into position in the carrier with its tread in engagement with the centering device 10 on the cross piece 8 of the upright 6 and the strap 40 has been brought into engagement with the tread on the diametrically opposite side of the tire 20, a link of the chain 42 may be hooked over the hook 44, after the strap has been pulled as tightly about the tread of the tire as is possible manually, and that then, by tightening the nut 48 on the threaded part of the rod 46 by means of a wrench, the strap 40 can be pulled more tightly against the part of the tread away from the centering device 10, thus insuring the clamping of the tire between the strap 40 and the centering device 10.

It will further be noted that, as the strap 40 is pulled up tightly against the tread of the tire by the tightening of the nut 48 on the rod 46, the pull of the chain 42 on the hook 44 on the derrick boom 12 will serve also to hold said derrick boom against any shifting movement. Of course the derrick boom is also held in its upright position by means of the screw 34, the socket 32 and the bracket 30.

The parts being in the position shown in Figure 1, if it be desired to change a tire it is necessary first to release the strap 40 by unscrewing the nut 48, sufficiently to unhook the chain 42 from the hook 44 before the derrick boom 12 can be operated to transport the spare tire 20 from the carrier substantially to the point of use. This can be done, of course, as just suggested, by simply unscrewing the nut 48 sufficiently to permit the link of the chain 42, which is hooked over the hook 44, to be unhooked therefrom. When unhooked it will be obvious that the strap 40 can be moved out of the way of the tire and out of the way of the operation of the derrick 12.

By turning the handle 38 the operator can then swing the spare tire 20 from its carried position shown in Figure 1 to the second dotted line position shown in Figure 2, where it will rest upon the surface upon which the truck stands, thus permitting the operator to unhook the looped cable 26 and roll the tire into position to apply it to the wheel on which it is to be used. If the tire changing is taking place in a garage, it is, of course, equally feasible to swing the derrick until the tire is deposited upon a tire-applying dolly or other tire-handling means.

From the foregoing description it will be seen that the invention provides simple, comparatively inexpensive and efficient means both for carrying a tire and for conveying or transporting it from its carried position to a point where the operator can readily manipulate it without manual lifting.

What is claimed as new is:

1. A combined spare tire carrier and tire-handling hoist for trucks comprising, in combination, a tire rest adapted to be supported on the truck, a derrick boom, of substantially U-shape, hinged to said rest by the ends of the legs of the U to swing about an axis parallel to that of the tire, arranged to straddle the carried tire and from the end of which remote from the hinge the tire may be suspended for handling, means for suspending said tire from said boom end for full swinging movement therethrough during handling, and means for swinging said boom to transport the tire suspended therefrom from its carried position in said rest to the surface upon which the truck stands and vice versa.

2. A combined spare tire carrier and tire-handling hoist according to claim 1 in which the tire rest is provided at one end with a stationary abutment arranged to be engaged by the tire tread, and in which means, connected to said stationary abutment and engaging the substantially diametrically opposite side of the tire tread, serves to secure said tire to the rest for carriage.

3. A combined spare tire carrier and tire-handling hoist according to claim 1 in which the tire rest is provided at one end with a stationary abutment arranged to be engaged by the tire tread and the derrick boom is hinged to the other end of said rest and in which a strap, engaging the tread of the tire at a point substantially diametrically opposite to that engaged by the abutment, is connected at one end to said abutment and at its other end to said boom to secure both said tire and said boom to said rest for carriage.

4. A combined spare tire carrier and tire-handling derrick according to claim 1 in which hooks carried by the legs of the boom near their union with the bight of the U provide supports for suspension of the carried tire for free swinging movement of the tire through the boom during the handling operations.

HAROLD G. HEIL.